United States Patent [19]
Mack

[11] Patent Number: 5,431,419
[45] Date of Patent: Jul. 11, 1995

[54] SELF-TIGHTENING HAMMER-DRILL CHUCK

[75] Inventor: Hans-Dieter Mack, Sontheim, Germany

[73] Assignee: Gunter Horst Rohm, Sontheim, Germany

[21] Appl. No.: 152,867

[22] Filed: Nov. 15, 1993

[30] Foreign Application Priority Data

Nov. 14, 1992 [DE] Germany .......................... 42 38 503.2
Apr. 22, 1993 [EP] European Pat. Off. ........... 93106527

[51] Int. Cl.6 ............................................. B23B 31/12
[52] U.S. Cl. .................................... 279/62; 279/140; 279/902
[58] Field of Search .................................... 279/60–65, 279/140, 902

[56] References Cited

U.S. PATENT DOCUMENTS

| | | | |
|---|---|---|---|
| 3,970,323 | 7/1976 | Schnizler, Jr. | 279/64 |
| 4,272,087 | 6/1981 | Rohm | 279/62 |
| 4,302,021 | 11/1981 | Rohm | 279/64 |
| 4,621,819 | 9/1984 | Rohm | 279/62 |
| 4,669,932 | 6/1987 | Hartley | 279/62 |
| 4,836,563 | 6/1989 | Rohm | 279/60 |
| 4,955,623 | 9/1990 | Rohm | 279/63 |
| 4,958,840 | 9/1990 | Palm | 279/62 |
| 5,236,206 | 8/1993 | Rohm | 279/60 |

FOREIGN PATENT DOCUMENTS 3416986 4/1985 Germany .
3426808 1/1986 Germany .
402172604 7/1990 Japan ........................... 279/902

*Primary Examiner*—Steven C. Bishop
*Attorney, Agent, or Firm*—Herbert Dubno; Andrew Wilford

[57] ABSTRACT

A drill chuck has a chuck body centered on an axis, a plurality of jaws radially displaceable on the body and each having a row of teeth, and an adjustment ring rotatable about the axis on the body but axially fixed thereon and formed with a screwthread meshing with the teeth of the jaws so that rotation of the ring on the body in a forward tightening direction displaces the jaws radially toward each other and opposite rotation displaces them radially away from each other. The adjustment ring is formed centered on the axis with an annular row of recesses having flanks and open in a predetermined direction. A holding ring is axially fixed on the body and abutments on the holding ring and body permit the holding ring to rotate on the body about the axis between a pair of angularly offset end positions. A return spring engaged between the holding ring and the body can be loaded to urge the holding ring in the forward direction on the body. A latch element on the holding ring has a head engageable opposite to the predetermined direction in the recesses. A spring and cam urge the head into the recesses with a force effective opposite to the predetermined direction except in one of the end positions of the holding ring. The flanks are angled and the spring forces are such that the angular force of the return spring cannot cam the head out of the recesses when engaged therein.

20 Claims, 11 Drawing Sheets

SELF-TIGHTENING HAMMER-DRILL CHUCK

FIELD OF THE INVENTION

The present invention relates to a drill chuck. More particularly this invention concerns a self-tightening drill chuck used on a hammer drill.

BACKGROUND OF THE INVENTION

A drill chuck such as described in German patent documents 3,416,986 and 3,426,808 for use with a tool having a shaft typically has a chuck body centered on and rotatable about an axis and an adjustment ring centered on the axis, rotatable about the axis on the chuck body, and axially fixed on the chuck body. The chuck body is formed with a plurality of angularly equispaced jaw-guide passages centered on respective jaw axes all lying on the surface of an imaginary cone centered on the axis. The adjustment ring is formed with a screwthread centered on the axis and exposed in the guide passages. Respective jaws displaceable in the passages along the respective axes are each formed with a row of teeth meshing with the screwthread so that relative rotation of the ring and chuck body in one direction moves the jaws radially inward and axially forward and opposite relative rotation moves the jaws radially outward and axially rearward.

So that such a chuck can be locked, the chuck body is provided with a spring-biased latch element to engage with any of an annular array of recesses formed on the adjustment ring. This element can move axially but not angularly on the chuck body and serves to keep the chuck in the position it is locked in. When the adjustment ring is forcibly rotated, the locking element ratchets or slides over the recesses in this ring, permitting the chuck to be tightened and loosened.

While such a system is effective in preventing the chuck from loosening, it is nonetheless possible, in particular when hammer-drilling, for the chuck jaws to bite into the drillbit shaft. In this case, even though the chuck body and adjustment ring have not moved relative to each other, the chuck has in effect loosened its grip on the tool.

Another disadvantage of the known system is that it is necessary to use considerable force at all times to rotate the adjustment ring on the chuck body, so as to overcome the spring of the latch element and cause it to slip. This is disadvantageous and serves no useful function.

OBJECTS OF THE INVENTION

It is therefore an object of the present invention to provide an improved hammer-drill chuck.

Another object is the provision of such an improved hammer-drill chuck which overcomes the above-given disadvantages, that is which is self-tightening and that also is easy to use.

SUMMARY OF THE INVENTION

A drill chuck has according to the invention a chuck body centered on an axis, a plurality of jaws radially displaceable on the body and each having a row of teeth, and an adjustment ring rotatable about the axis on the body but axially fixed thereon and formed with a screwthread meshing with the teeth of the jaws so that rotation of the ring on the body in a forward tightening direction displaces the jaws radially toward each other and opposite rotation displaces them radially away from each other. The adjustment ring is formed centered on the axis with an annular row of recesses having flanks and open in a predetermined direction. A holding ring is axially fixed on the body and abutments on the holding ring and body permit the holding ring to rotate on the body about the axis between a pair of angularly offset end positions. A return spring engaged between the holding ring and the body can be loaded to urge the holding ring in the forward direction on the body. A latch element on the holding ring has a head engageable opposite to the predetermined direction in the recesses. A spring and cam urge the head into the recesses with a force effective opposite to the predetermined direction except in one of the end positions of the holding ring. The flanks are angled and the spring forces are such that the angular force of the return spring cannot cam the head out of the recesses when engaged therein.

Thus with this system during tightening of the chuck the latch element ratchets. Once tightened, however, the return spring ensures that some force is applied to the adjustment ring so that any looseness that develops during drilling will be taken up. Furthermore when released the latch element is pushed away and locked out of the way, making the chuck fairly easy to open up.

According to the invention the holding and adjustment rings are axially adjacent and surround the chuck body and together extend generally the full axial length of the chuck body so that the chuck body is substantially enclosed by the rings.

The spring and cam according to the invention include a cam surface formed on the body having a main portion equispaced from the row of teeth and an angled ramp portion inclined away from the row of teeth. The latch element rides on the cam-surface portions and the cam surface is formed generally between its portions with a seat in which the element is engageable. This seat prevents inadvertent switching-off of the locking function.

In accordance with a further feature of the invention the element is formed as a spring having a pair of portions joined at an elbow. One of the spring portions extends generally axially and forms the latch head and the other spring portion extends generally angularly of the axis. More particularly, the one spring portion elastically biases the head in the predetermined direction away from the row of recesses and the other spring portion biases the element against the cam surface. To stabilize this element, the holding ring is provided with formations angularly trapping the element generally at the elbow. It is also possible for the spring forming the holding element to also form the return spring.

In another arrangement according to the invention the latch element is formed as an axially extending finger on the holding ring and having a radially deflectable end forming the head. This finger is unitarily formed on the holding ring. In any situations it is possible for at least two elements to be provided angularly spaced by a distance equal to other than a whole-number multiple of the angular dimension of each recess. Thus only one of the heads at a time is engaged in a recess, ensuring very fine ratchet-adjustment.

The recesses of this invention are radially inwardly open and the heads engage radially inward on the cam and the abutments include a flat surface and a pair of angled surfaces flatly engageable therewith. These abutments can also include at least one radially outwardly projecting block on the chuck body and at least one radially inwardly open pocket formed on the holding ring, receiving the block, and of an angular dimension substantially greater than an angular dimension of the block. The locking element is in the pocket and the cam includes a surface formed on the block. Alternately, the block is formed on an intermediate ring fixed on the chuck body. It is also possible for the chuck body to have a forwardly directed rim having a radially outwardly directed edge defining a cam surface forming the cam means. The rim is radially elastically deflectable. When the intermediate ring is of two parts, it is stabilized by the holding ring which surrounds it.

According to a further feature of this invention one flank of each recess—normally the leading flank—is relatively steep and the other flank is relatively shallow. This ensures relatively easy ratcheting during tightening, but solid holding once tightened.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
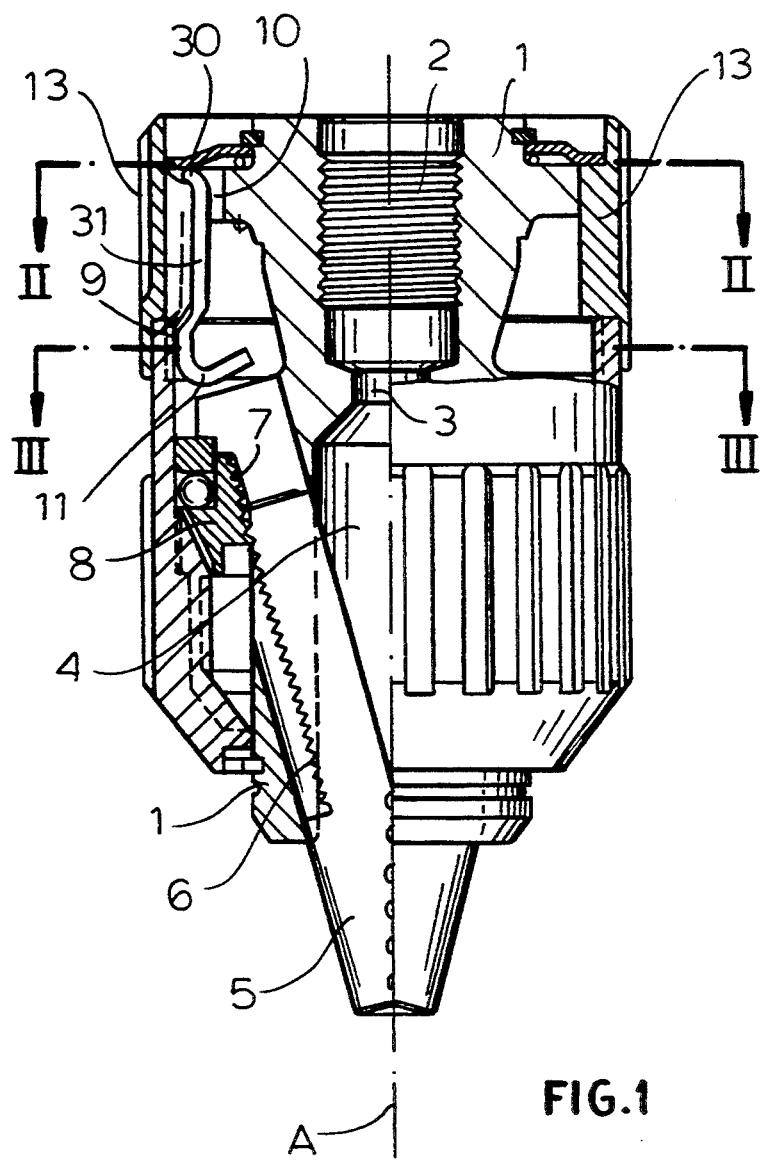
FIG. 1 is a side view partly in axial section through a first embodiment of the chuck according to the invention.
Figure 2:
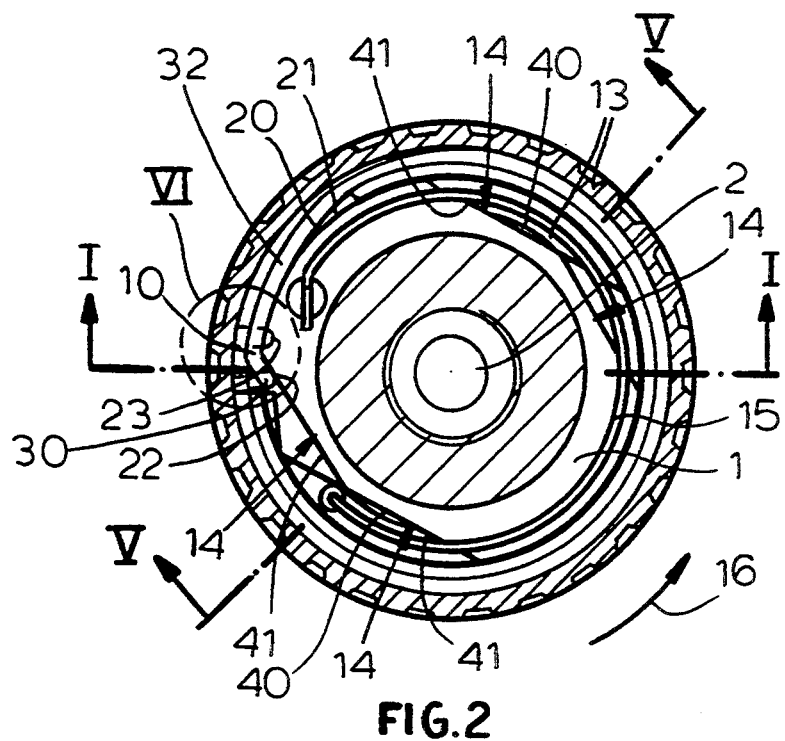
FIGS. 2 and 3 are sections taken along respective lines II—II and III—III of FIG. 1.

As seen in FIGS. 1 through 6 a chuck according to this invention has a machined steel chuck body 1 centered on an axis A and formed with a rearwardly open threaded bore 2 normally fitted over a threaded spindle of a drill drive, a forwardly open front hole 4 adapted to receive the shank of a tool, and a central passage 2 interconnecting the holes 3 and 4 and allowing a hammer rod in the unillustrated and normally tubular drill spindle to strike the rear end of the unillustrated tool. As is standard, three jaws 5 are seated in angled guides in the body 1 and have outer edges each formed with a row of teeth 6 in mesh with a screwthread 7 of an adjustment ring 8 that is rotatable but not axially displaceable on the body 1. Rotation of the ring 8 in a forward direction 16 moves the jaws 5 axially forward (down in FIG. 1) and radially inward to close or tighten the chuck and opposite rotation moves them axially backward and radially outward to open or loosen the chuck.

According to the invention a latch element 10 has a head 11 that can engage radially outward into any of an annular array of radially inwardly open V-shaped seats 9 formed in an inner face of the tubularly cylindrical adjustment ring 8. This element 10 is carried on and rotationally displaceable with a holding ring 13 that is axially fixed and limitedly angularly displaceable on the body 1. Abutments 14 for defining this limited range of angular movement are formed by a pair of radially inwardly and diametrically oppositely directed planar faces on the ring 13 and two pairs of radially outwardly directed faces 41 on the body 1. Each face 41 forms an obtuse angle of between 90° and 180° with the other face 41 of the respective pair and the difference between this obtuse angle and 180° determines the amount of relative rotation possible between the two parts 1 and 13. A spring 15 engaged between the ring 8 and the ring 13 rotationally biases the ring 8 relative to the ring 13 in the tightening direction 16 when this spring 15 is under load.

The recesses 9 have flat flanks 12 and the leading flanks, relative to the direction 16, are steeper than the trailing flanks. During manual adjustment of the chucks, the head 11 ratchets on the recesses 9, riding from one to the next with elastic deformation of the element 10 while during drilling the head 10 sits in one of the recesses 9 to prevent reverse rotation of the ring 8. The force of the spring 15 is such, relative to the spring force of the element 10 and the angles of the flanks, to move the head 11 angularly when it is seated in one of the recesses 9. The position of the head 11 when engaged in one of the recesses 9 is shown in dot-dash lines at 11″ in FIGS. 4 and 6. A weight can be mounted on the head 11 as illustrated schematically at 17 in FIG. 4 to increase the force with which the head 11 presses into the recesses 9 when the chuck is rotated at high speed.

Figure 6:
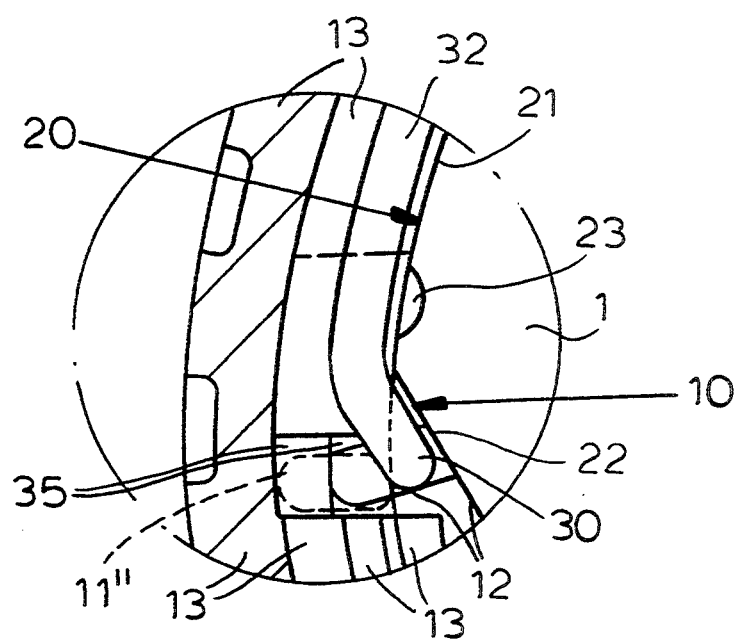
FIG. 6 is a large-scale view of the detail shown at VI in FIG. 2.

The latch element 10 is operated by a cam 20 formed on the body 1 that presses the head 11 radially outward into the seats 9 except when the ring 13 is in an end position corresponding to rotation of the ring 13 on the body 1 in the direction 16 to the end position, with each face 40 engaging the leading one of the faces 41. This is effected in FIGS. 1 through 6 by forming the element 10 as a spring-steel rod subdivided at a bend 30 into a depending leg 31 forming the head 11 and an upper arcuate leg 32 seated in the holding ring 13. The bend 30 engages the cam surface 20 which is a radially outwardly directed surface on the body 1 and that has as best seen in FIG. 6 a partcylindrical portion 21 that, when it bears radially outward against the elbow 30, presses the head 11 against the springiness of the spring 10 into the seats 9. At its leading (relative to the direction 16) end, the surface 21 has an inwardly angled ramp 22 forming a pocket. When the elbow 30 rides inward on the ramp 22 as seen in FIG. 6, the head 11 pulls radially out of engagement with the seats 9. A radially inwardly open notch 35 in the ring 13 angularly stabilizes the head end of the element 10. A seat 23 is provided at the end of the surface 21 near the ramp 22 to prevent the head 11 from inadvertently being moved into the disengaged position.

Figure 7:
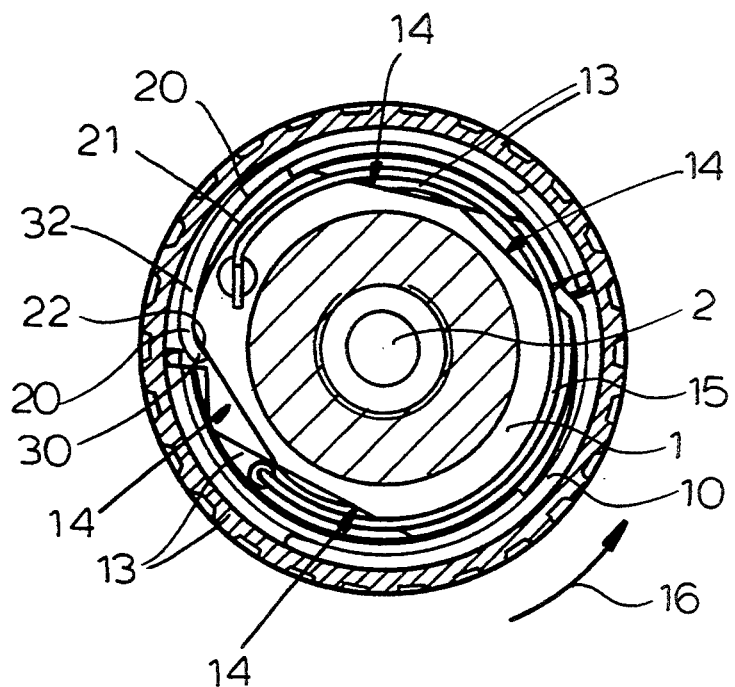
FIGS. 7 and 8 are views like FIG. 2 of variants on the first embodiment of the invention.
Figure 3:
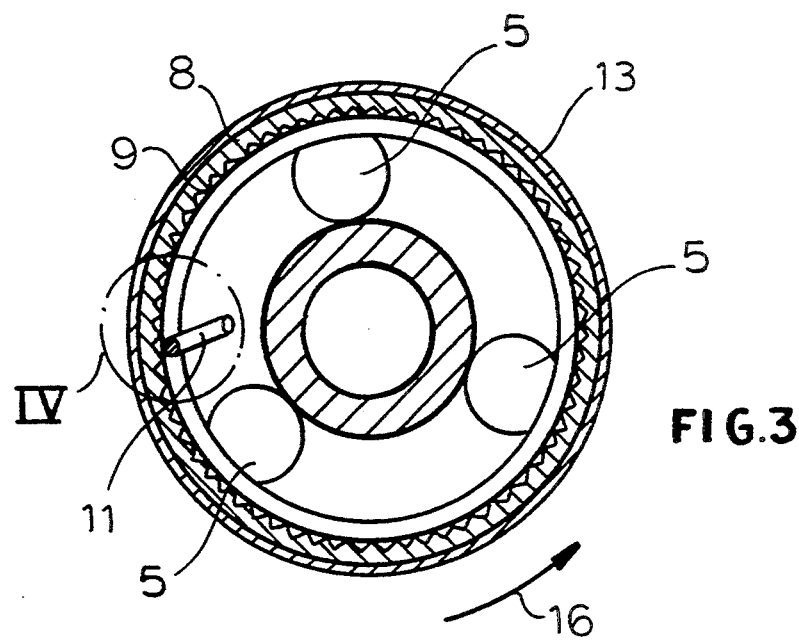
Figure 4:
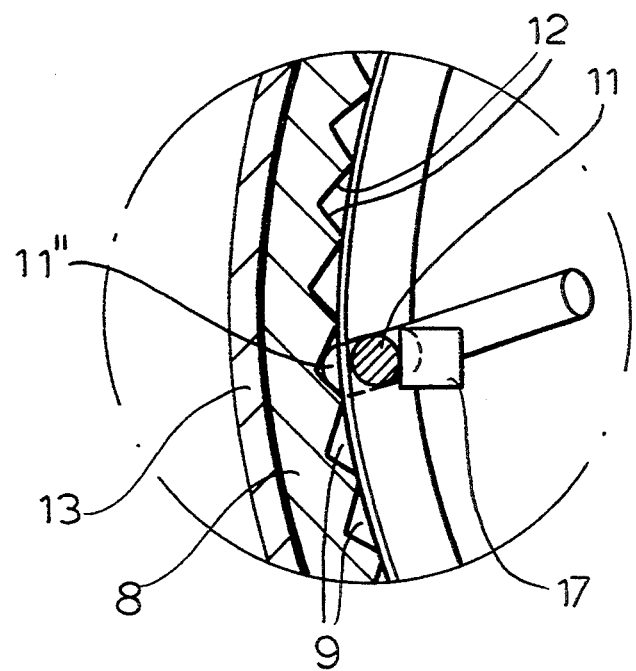
FIG. 4 is a large-scale view of the detail shown at IV in FIG. 3.
Figure 5:
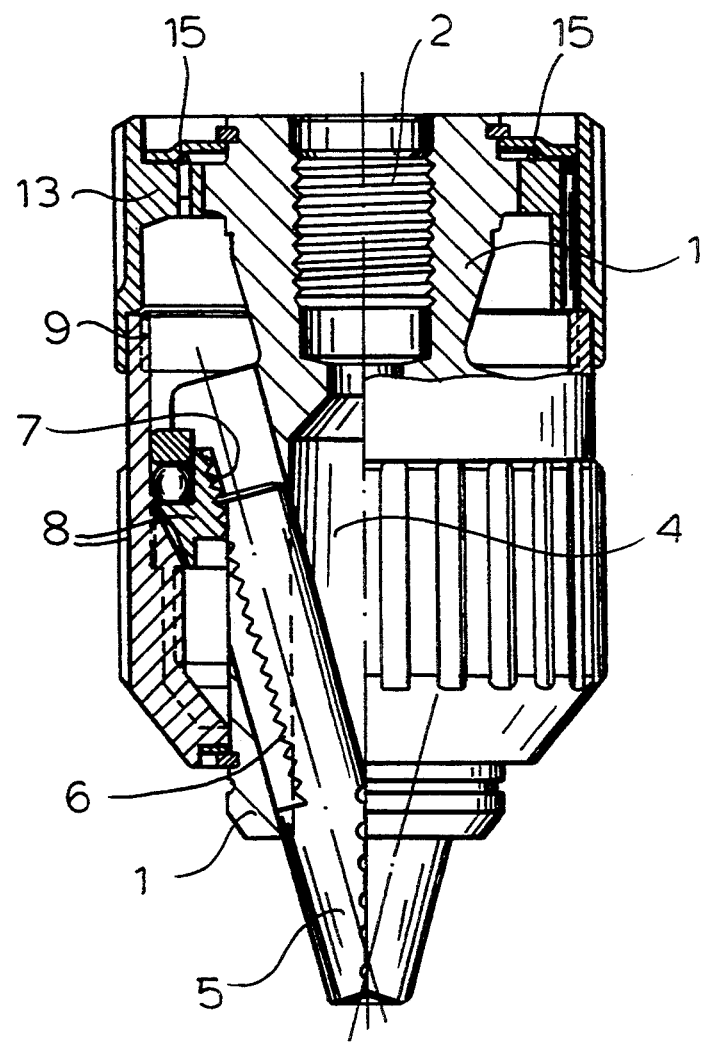
FIG. 5 is a section taken along line V—V of FIG. 2 of the first embodiment.

In FIG. 7 there are two such elements 10 and cams 20. They are spaced angularly apart by a distance equal to 180° minus the angular dimension of one half of a recess 9 so that at any time only one of the heads 11 is seated in one of the recesses 9. This in effect doubles the fineness of adjustment.

Figure 8:
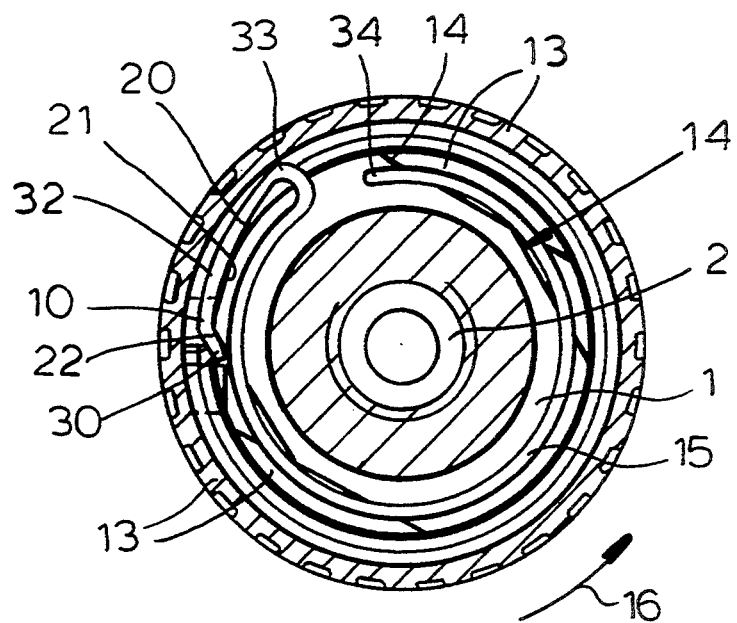

FIG. 8 shows an arrangement where a single spring bent into a hairpin elbow 33 forms both the latch element 10 and the return spring 15.

The system described above operates as follows:

To tighten the chuck on a tool, this tool is fitted into the opening 4 between the jaws 5, which have been retracted, and the user grasps the holding ring 13 in one hand to hold it still and grasps the adjustment sleeve 8 in the other hand and rotates it in the direction 16. During such actuation the head 11 will ratchet along the seats 9. Once the jaws 5 engage the tool, however, the body 1 is entrained rotationally in the direction 16 until the trailing abutments 14 meet and further forward rotation of the body 1 is prevented. During this movement the spring 15 is loaded so that, when the tightening is complete, the spring 15 is urging the ring 8 rotationally in the direction 16.

During drilling if the jaws 5 dig into the bit, the spring 15 automatically advances the jaws 5 slightly to compensate. Thus the chuck remains tight.

To loosen the chuck the ring 13 is again held stationarily by the user but the ring 8 is rotated against the direction 16 until the leading abutments 14 engage each other, whereupon the chuck body 1 is reverse rotated. This brings the latch element 10 into the ramp 21 so that it disengages from the seats 9 and allows free reverse rotation of the ring 8 relative to the ring 13.

Figure 9:
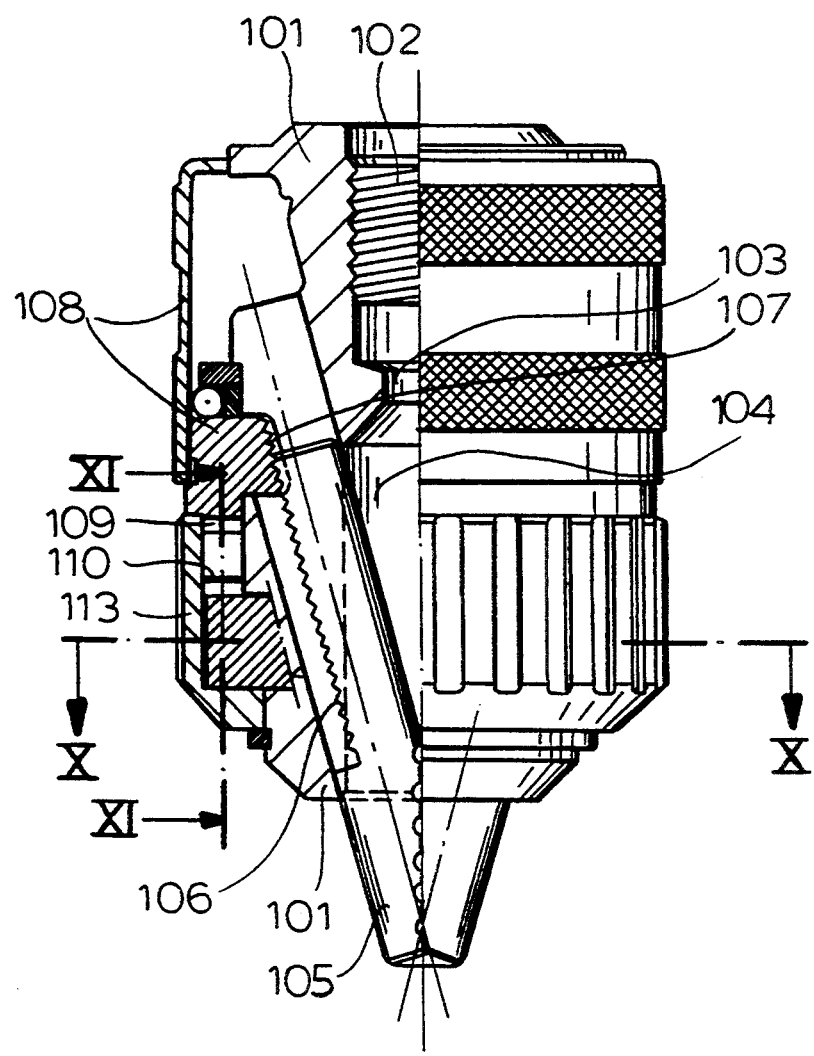
FIG. 9 is a side view like FIG. 1 of a second embodiment of the invention.
Figure 10:
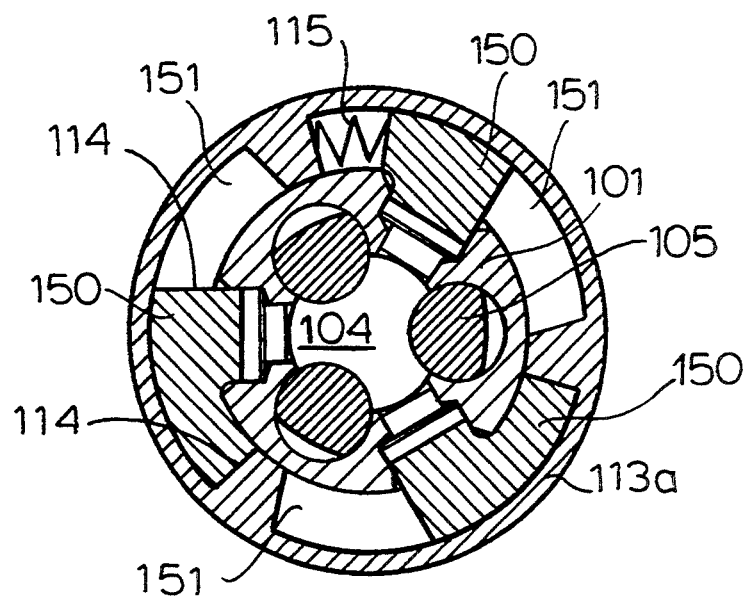
FIG. 10 is a section taken along line X—X of FIG. 9.
Figure 11:
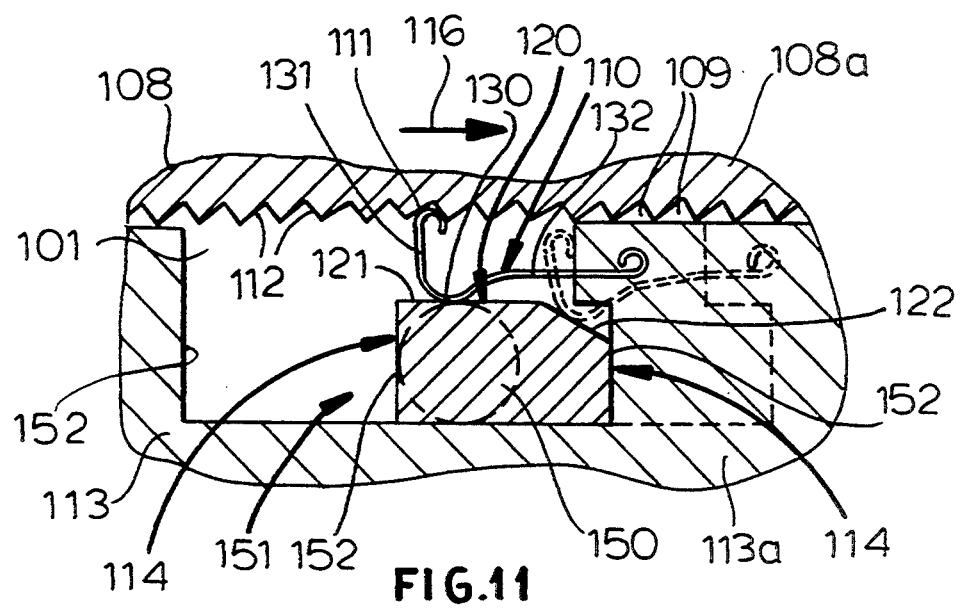
FIG. 11 is a large-scale sectional view taken along line XI—XI of FIG. 9.

In the arrangement of FIGS. 9 through 11, where reference numerals from FIGS. 1-6 are used but augmented by 100, abutments 114 are formed by radially outwardly projecting blocks 150 carried on the body 101 and engaged in radially inwardly open recesses or pockets 151 formed in the ring 113, whose axial positions are reversed. The pockets 151 are angularly much longer than the blocks 150 so that some relative angular movement is possible, and end faces 152 of the blocks 150 and pockets 151 define the limits of travel. The springs 115 here are band springs that engage axially forward into axially backwardly directed recesses 109 of the adjustment ring 108. The ramp 122 on each block 150 allows the respective spring 115 to pull out of engagement with the ring 108. There are three such projecting blocks 150 and springs 115 for particularly fine adjustment.

Figure 12:
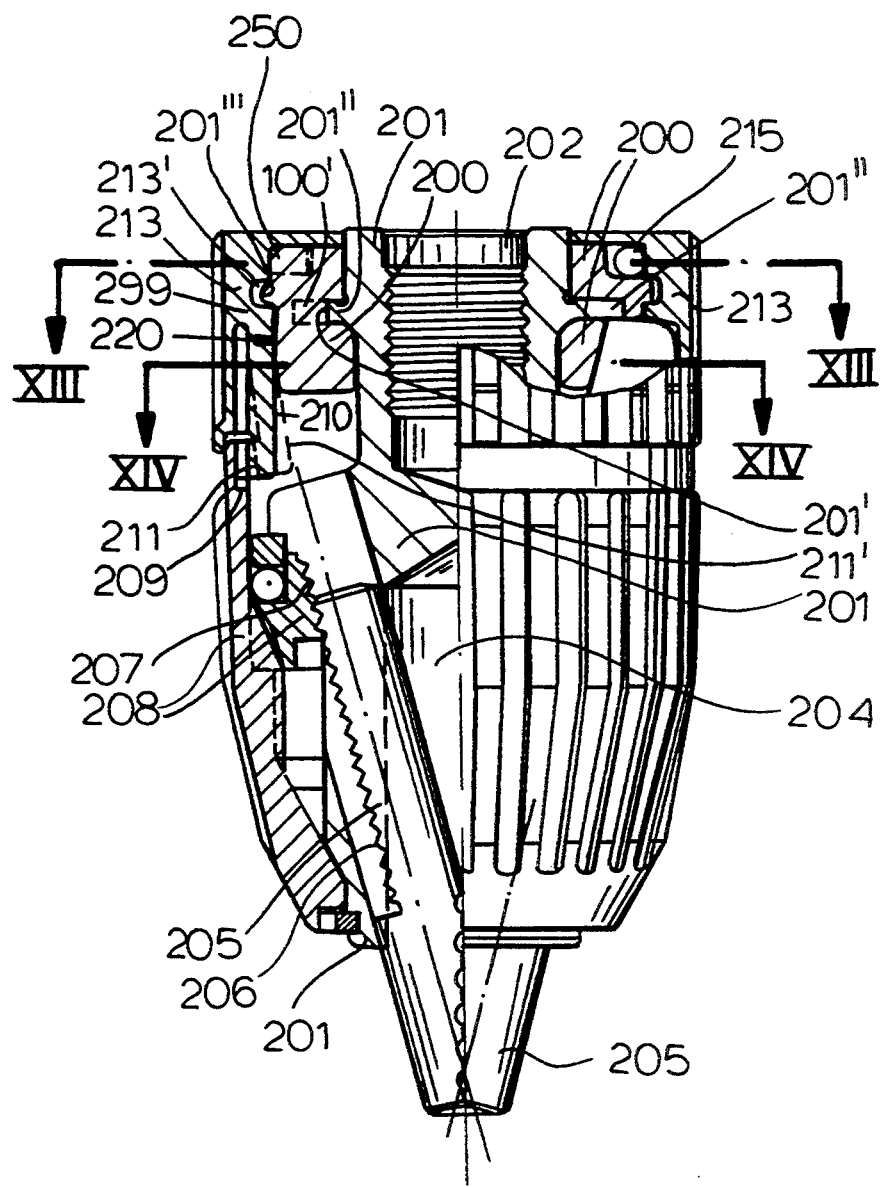
FIG. 12 is a side view like FIG. 1 of a third embodiment of the invention.
Figure 13:
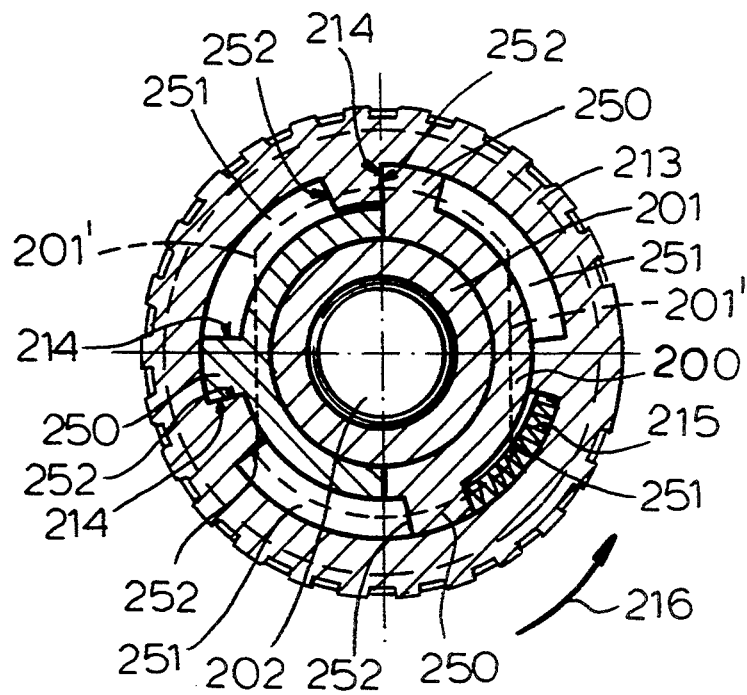
FIGS. 13 and 14 are sections taken along respective lines XIII—XIII and XIV—XIV of FIG. 12.
Figure 14:
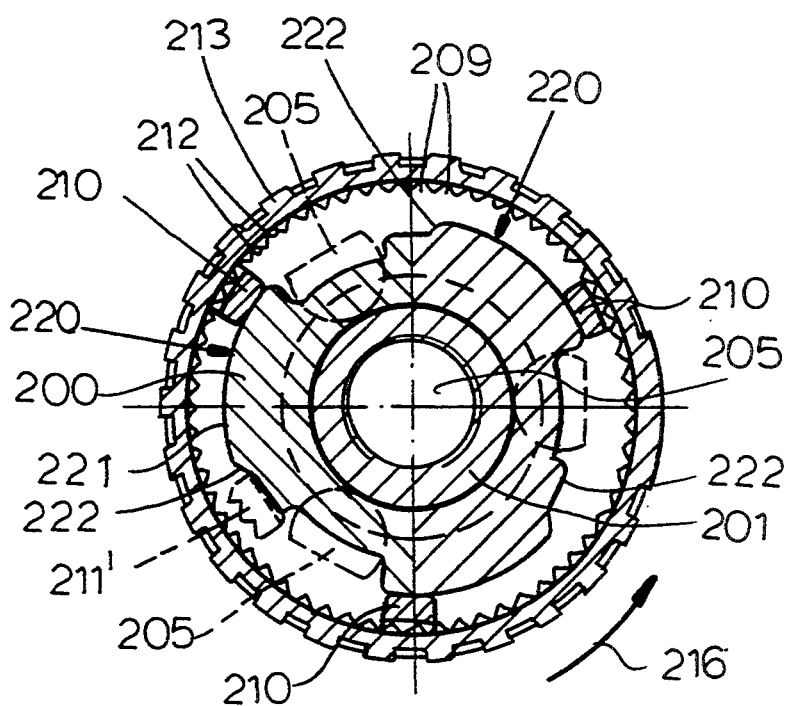

FIGS. 12 through 14, where references from FIGS. 1-6 are augmented by 200, show another chuck where the latch elements 210 are formed by integral axially forwardly extending fingers of a ring 200 fixed on the body 201. The body 201 has flats 201' preventing the cam ring 200, which is made in two semicircular parts, from rotating on it and is formed with a radially outwardly projecting circumferential ridge 201'' engaging in a radially inwardly opening circumferential groove 100' of the ring 200 to axially lock them together. In addition this ring 200 has a radially outwardly projecting circumferential ridge 201''' fitting in a radially inwardly open annular groove 213' of the ring 213 to lock these two parts together. Here also, the springs 215 are engaged angularly between faces 252 forming the abutments 214 to rotationally bias the ring 213 relative to the ring 208. The heads 211 of the element 210 are shown at 211' in their disengaged positions in FIGS. 12 and 14.

Figure 15:
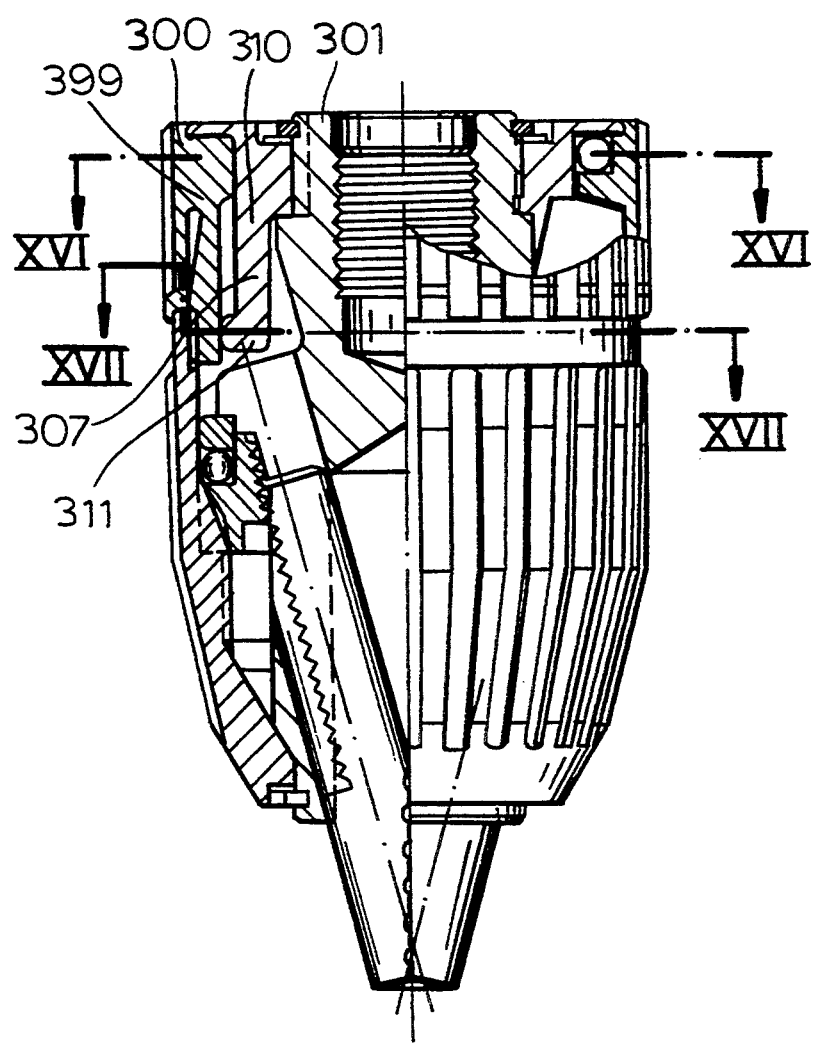
FIG. 15 is a side view like FIG. 1 of a fourth embodiment of the invention.
Figure 17:
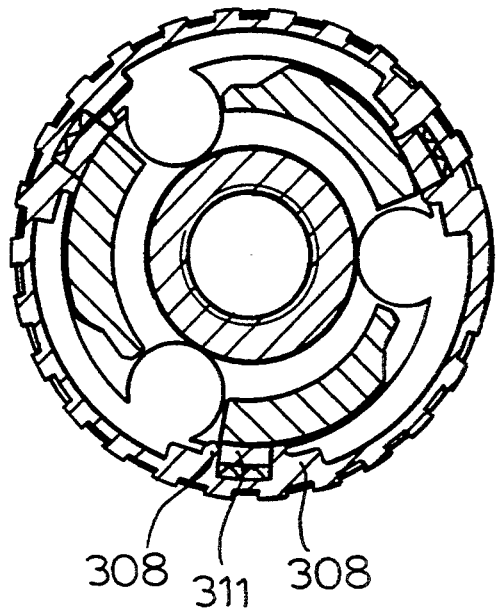
FIGS. 16 and 17 are sections taken along respective lines XVI—XVI and XVII—XVII of FIG. 15.
Figure 16:
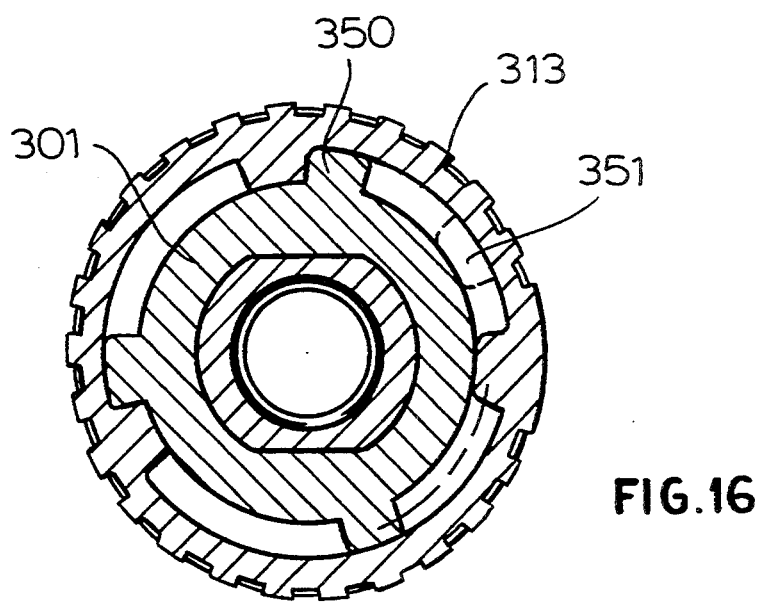

In FIGS. 15 through 17, where references from FIGS. 1-6 are augmented by 300, the intermediate ring 300 is made in one piece and slid axially over the chuck body 301 on which it is angularly and axially fixed. The cam is formed along the axial front edge of wall parts 307 of the ring 300 that are radially deflectable so as to bear elastically on the head 311 carried on the arms 310. These arms 310 are trapped angularly between abutments 308 to stiffen them in the angular direction.

I claim:

1. A drill chuck comprising:
   a chuck body centered on an axis;
   a plurality of jaws radially displaceable on the body and each having a row of teeth;
   an adjustment ring rotatable about the axis on the body but axially fixed thereon and formed with a screwthread meshing with the teeth of the jaws, whereby rotation of the ring on the body in a forward tightening direction displaces the jaws radially toward each other and opposite rotation displaces them radially away from each other, the adjustment ring being formed centered on the axis with an annular row of recesses having flanks and open in a predetermined direction;
   a holding ring axially fixed on the body;
   abutments on the holding ring and body permitting the holding ring to rotate on the body about the axis between a pair of angularly offset end positions;
   a return spring engaged between the holding ring and the body loadable to urge the holding ring in the forward direction on the body;
   a latch element on the holding ring having a head engageable opposite to the predetermined direction in the recesses; and
   spring and cam means for urging the head into the recesses with a force effective opposite to the predetermined direction except in one of the end positions of the holding ring, the flanks being angled and the spring forces being such that the angular force of the return spring cannot cam the head out of the recesses when engaged therein.

2. The drill chuck defined in claim 1 wherein the holding and adjustment rings are axially adjacent on and surround the chuck body and together extend generally the full axial length of the chuck body, whereby the chuck body is substantially enclosed by the rings.

3. The drill chuck defined in claim 1 wherein the spring and cam means includes a cam surface formed on the body having a main portion equispaced from the row of teeth and an angled ramp portion inclined away from the row of teeth, the latch element riding on the cam-surface portions.

4. The drill chuck defined in claim 3 wherein the cam surface is formed generally between its portions with a seat in which the element is engageable.

5. The drill chuck defined in claim 3 wherein the element is formed as a spring constituting the spring means and having a pair of portions joined at an elbow, one of the spring portions extending generally axially and forming the head and the other spring portion extending generally angularly of the axis.

6. The drill chuck defined in claim 5 wherein the one spring portion elastically biases the head in the predetermined direction away from the row of recesses and the other spring portion biases the element against the cam surface.

7. The drill chuck defined in claim 3 wherein the holding ring is provided with formations angularly trapping the element generally at the elbow.

8. The drill chuck defined in claim 3 wherein the spring forming the holding element also forms the return spring.

9. The drill chuck defined in claim 1 wherein the latch element is formed as an axially extending finger on the holding ring and having a radially deflectable end forming the head.

10. The drill chuck defined in claim 9 wherein the finger is unitarily formed on the holding ring.

11. The drill chuck defined in claim 1 wherein at least two elements are provided and they are angularly spaced by a distance equal to other than a whole-number multiple of the angular dimension of each recess.

12. The drill chuck defined in claim 1 wherein the recesses are radially inwardly open and the heads engage radially inward on the cam means.

13. The drill chuck defined in claim 1 wherein the abutments include a flat surface and a pair of angled surfaces flatly engageable therewith.

14. The drill chuck defined in claim 1 wherein the abutments include at least one radially outwardly projecting block on the chuck body and at least one radially inwardly open pocket formed on the holding ring, receiving the block, and of an angular dimension substantially greater than an angular dimension of the block.

15. The drill chuck defined in claim 14 wherein the locking element is in the pocket and the cam means includes a surface formed on the block.

16. The drill chuck defined in claim 14 wherein the block is formed on an intermediate ring fixed on the chuck body.

17. The drill chuck defined in claim 14 wherein the chuck body has a forwardly directed rim having an radially outwardly directed edge defining a cam surface forming the cam means, the rim being radially elastically deflectable.

18. The drill chuck defined in claim 14 wherein the block is formed on an two-part intermediate ring fixed on the chuck body and surrounded by the holding ring.

19. The drill chuck defined in claim 1 wherein one flank of each recess is relatively steep and the other flank is relatively shallow.

20. The drill chuck defined in claim 19 wherein relative to the forward direction the front flank of each recess is steep and the rear flank is relatively shallow.

* * * * *